United States Patent
Tomita

(10) Patent No.: US 6,668,274 B1
(45) Date of Patent: Dec. 23, 2003

(54) APPARATUS MANAGEMENT UNIT AND APPARATUS MANAGEMENT SYSTEM

(75) Inventor: Atsushi Tomita, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/549,238

(22) Filed: Apr. 13, 2000

(30) Foreign Application Priority Data

Apr. 16, 1999 (JP) ............................................. 11-109736

(51) Int. Cl.$^7$ .............................. G06F 15/16; G06F 1/26
(52) U.S. Cl. ........................ 709/206; 709/217; 713/300
(58) Field of Search ................................ 713/300, 310, 713/320; 455/413; 399/90.01; 709/206; 370/338, 352; 379/93.24

(56) References Cited

U.S. PATENT DOCUMENTS

| | | | |
|---|---|---|---|
| 5,293,196 A | | 3/1994 | Kaneko et al. |
| 5,844,969 A | * | 12/1998 | Goldman et al. ........ 379/93.24 |
| 5,850,519 A | | 12/1998 | Vazana |
| 5,905,777 A | * | 5/1999 | Foladare et al. ......... 379/90.01 |
| 5,987,614 A | * | 11/1999 | Mitchell et al. ............ 713/300 |
| 6,389,276 B1 | * | 5/2002 | Brilla et al. ................ 455/413 |
| 6,408,395 B1 | * | 6/2002 | Sugahara et al. ........... 713/310 |
| 6,415,387 B1 | * | 7/2002 | Aguilar et al. ............... 713/320 |
| 6,438,583 B1 | * | 8/2002 | McDowell et al. ......... 709/206 |
| 6,445,694 B1 | * | 9/2002 | Swartz ....................... 370/352 |
| 6,519,242 B1 | * | 2/2003 | Emery et al. ............... 370/338 |

FOREIGN PATENT DOCUMENTS

| | | |
|---|---|---|
| JP | 4-318731 | 11/1992 |
| JP | 4-318859 | 11/1992 |
| JP | 11-146107 | 5/1999 |
| JP | 11-234495 | 8/1999 |

* cited by examiner

*Primary Examiner*—David Wiley
*Assistant Examiner*—Michael Delgado
(74) *Attorney, Agent, or Firm*—McDermott, Will & Emery

(57) ABSTRACT

An apparatus management unit requests another apparatus management unit connected to the LAN to perform vicarious checking of the presence or absence of a packet addressed to itself. The requested apparatus management unit checks the presence or absence of a packet addressed to the requester apparatus management unit, and when there is a packet, notifies the requester apparatus management unit of the presence of the, packet via the LAN. Consequently, even in the sleep mode, the presence or absence of a mail addressed to an apparatus management unit can be checked and the mail can be taken in without any delay because the presence or absence of a packet addressed to the apparatus management unit is checked by another apparatus management unit.

20 Claims, 17 Drawing Sheets

Ethernet header: hardware address for destination,
 hardware address for transmitting end, etc
IP header : IP address for transmitting end,
 IP address for destination, etc
TCP header : port number for transmitting end,
 port number for destination, etc
data : including message field

Fig.12

| index | IP address | Acount name | password |
|---|---|---|---|
| 1 | 0.0.0.1 | Acount-1 | ******** |
| 2 | 0.0.0.2 | Acount-2 | ******** |
| ⋮ | ⋮ | ⋮ | ⋮ |
| n | 0.0.0.n | Acount-n | ******** |

APPARATUS MANAGEMENT UNIT AND APPARATUS MANAGEMENT SYSTEM

This application is based on application No. 11-109736 filed in Japan, the contents of which are hereby incorporated by reference.

BACKGROUND OF THE INVENTION

1. Field of the Invention

The present invention relates to an apparatus management unit that collects data on a connected apparatus and transmits the data to a centralized management unit, and manages the apparatus based on apparatus management data transmitted from the centralized management unit. Moreover, the present invention relates to an apparatus management system that manages the apparatuses connected to a plurality of apparatus management units by performing data communication between a centralized management unit and the apparatus management units via a network.

2. Description of the Related Art

Japanese Laid-open Patent Application No. H4-318731 proposes an apparatus management unit that is connectable to a centralized management unit via the public telephone line and transmits information on an apparatus to be managed to the centralized management unit. Japanese Laid-open Patent Application No. H4-318859 proposes an apparatus management unit that, when something is wrong with a connected copier, stops the operation of the copier in accordance with an instruction from a centralized management unit.

Examples of the system in which a centralized management unit and an apparatus management unit are connected as described above include not only the system in which these units are connected by use of the public telephone line but also a system that performs communication by use of the Internet and a radio communication system that uses a PHS (Personal Handy Phone system) or a cellular phone as a terminal unit with the diversification of the communication technology.

There are cases where in a system in which apparatus management data is transmitted and received as a packet between a centralized management unit and a-plurality of apparatus management units, the apparatus management units and a mail server are connected by a LAN (local-area network). For such a LAN, a system is known in which a packet transmitted from the centralized management unit to a certain apparatus management unit is temporarily stored in the mail server, and the apparatus management unit checks the mail server to see if there is a mail addressed to itself and reads the newly-arrived mail when there is one. Therefore, in such a management system, it is necessary for each apparatus management unit to periodically check the presence or absence of a mail addressed to itself.

An apparatus management unit connected to an apparatus to be managed such as a copier or a printer is provided with a sleep mode in view of energy saving. That is, a low-power-consumption mode is provided of bringing functions other than minimum necessary functions into sleep state after the apparatus or the apparatus management unit is idle for more than a predetermined time.

When an apparatus management unit provided with such a sleep mode is used in the above-described management system connected to the mail server, the apparatus management unit being set in sleep state cannot check the mail server to see if there is a mail addressed to itself. Consequently, necessary management data cannot be obtained.

SUMMARY OF THE INVENTION

An object of the present invention is to solve the above-mentioned problem.

Another object of the present invention is to make it possible to, in a system in which apparatus management data is transmitted and received between a centralized management unit and a plurality of apparatus management units as a packet, take in the apparatus management data without any delay by enabling the presence or absence of a mail addressed to an apparatus management unit to be checked even when the apparatus management unit is set in a sleep mode.

An apparatus management unit according to a first aspect achieving the above-mentioned objects is an apparatus management unit that sends out a mail addressed to a centralized management unit to a communication network via a LAN, and takes in a mail addressed to itself from a mail server connected to the LAN, the apparatus management unit comprising: accepting means for accepting a request, from a second apparatus management unit connected to the LAN, for vicarious checking of the presence or absence of a mail addressed to the second apparatus management unit; vicarious checking means for checking the mail server to see if there is the mail addressed to the second apparatus management unit when the accepting means accepts the request for vicarious checking; and notifying means for, when there is the mail addressed to the second apparatus management unit, notifying the second apparatus management unit of the presence of the mail via the LAN.

An apparatus management system according to a second aspect achieving the above-mentioned objects is an apparatus management system in which a mail server and a plurality of apparatus management units each connected to an apparatus to be managed are connected by a LAN, the mail server receives mails addressed to the apparatus management units from an external communication network, and each of the apparatus management units takes in a mail addressed to itself from the mail server, said apparatus management unit comprises: accepting means for accepting a request, from a second apparatus management unit connected to the LAN, for vicarious checking of the presence or absence of the mail addressed to the second apparatus management unit; vicarious checking means for checking the mail server to see if there is the mail addressed to the second apparatus management unit when the accepting means accepts the request for vicarious checking; and notifying means for, when there is the mail addressed to the second apparatus management unit, notifying the second apparatus management unit of the presence of the mail via the LAN.

An apparatus management system according to a third aspect achieving the above-mentioned objects is an apparatus management system that manages apparatuses connected to first and second apparatus management units by transmitting and receiving mails including apparatus management data between a centralized management unit and the first and second apparatus management units, having a mail server which is connected to the first and second apparatus management units, and receiving mails addressed to the apparatus management units from an external communication network, said first apparatus management unit comprises: accepting means for accepting a request, from the second apparatus management unit, for vicarious checking of the presence or absence of a mail addressed to the second apparatus management unit; vicarious checking means for checking the mail server to see if there is the mail addressed to the second apparatus management unit when the accepting means accepts the request for vicarious checking; and notifying means for notifying the second apparatus management unit of the presence of the mail when there is the mail addressed to the second apparatus management unit.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 12 is an explanatory view showing a vicarious checking request list;

In the following description, like parts are designated by like reference numbers throughout the several drawings.

DESCRIPTION OF THE PREFERRED EMBODIMENTS

Hereinafter, an embodiment of the present invention will be described. In this embodiment, description will be given with copiers as the apparatuses and with data terminals (DTs) as the apparatus management units. That is, the present invention will be described with respect to a management system in which data terminals (user side units) connected to the copiers are capable of transmitting and receiving data to and from the centralized management unit (center side unit) via the Internet. For simplification, description will be given with respect to an example in which two data terminals (DTs) connectable to a common mail server are used as the user side units. When it is necessary to distinguish between the two data terminals, they are denoted by 1-1 and 1-2. Things common to the two data terminals will be described with respect to one data terminal for simplification and the data terminal is denoted by 1-x. The numbers posterior to the hyphen are common to the data terminals and the copiers. For example, a copier 4-1 is connected to a data terminal 1-1.

[1] System Configuration

Figure 1:
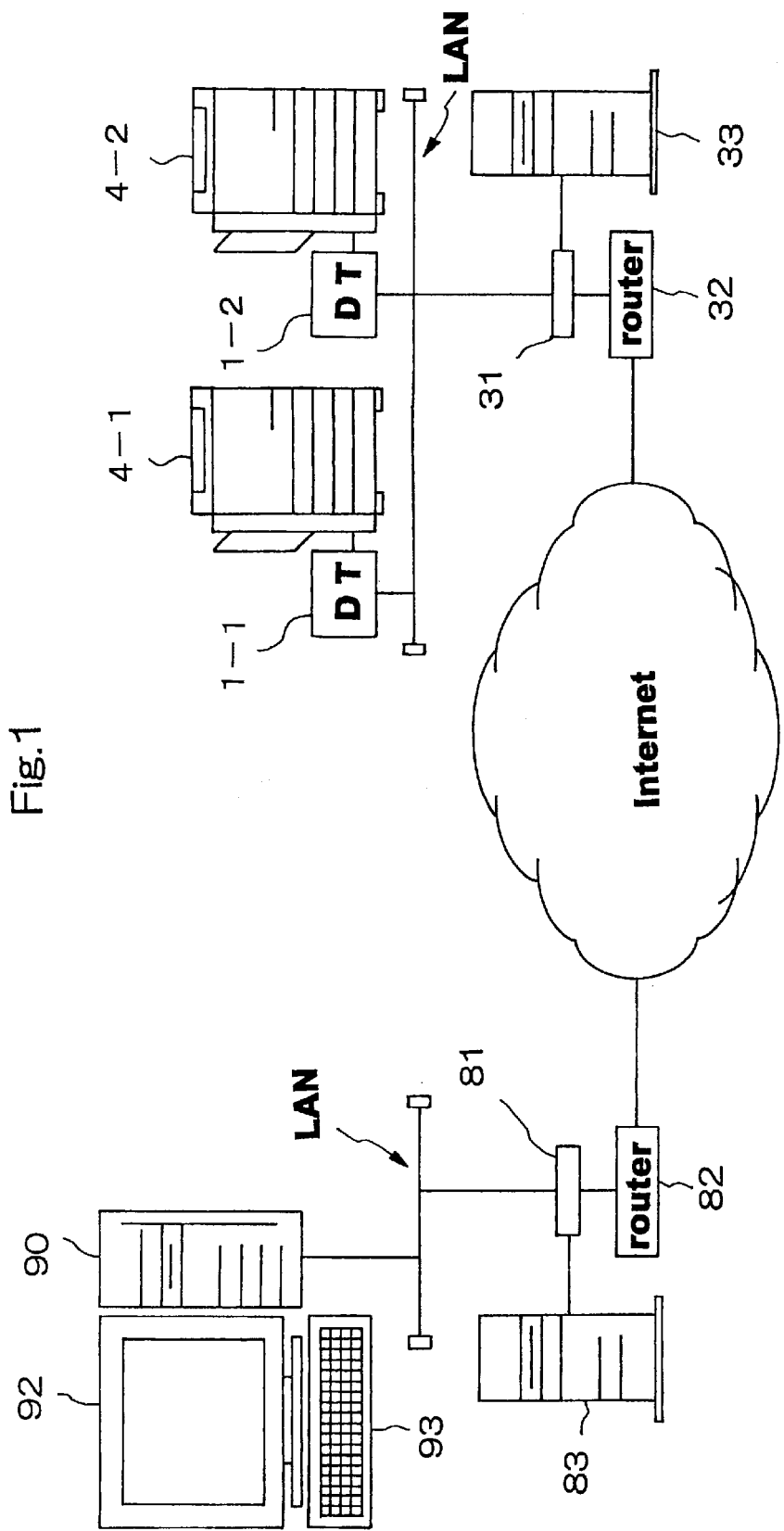
FIG. 1 is a schematic view showing the configuration of a management system of an embodiment.
Figure 2:
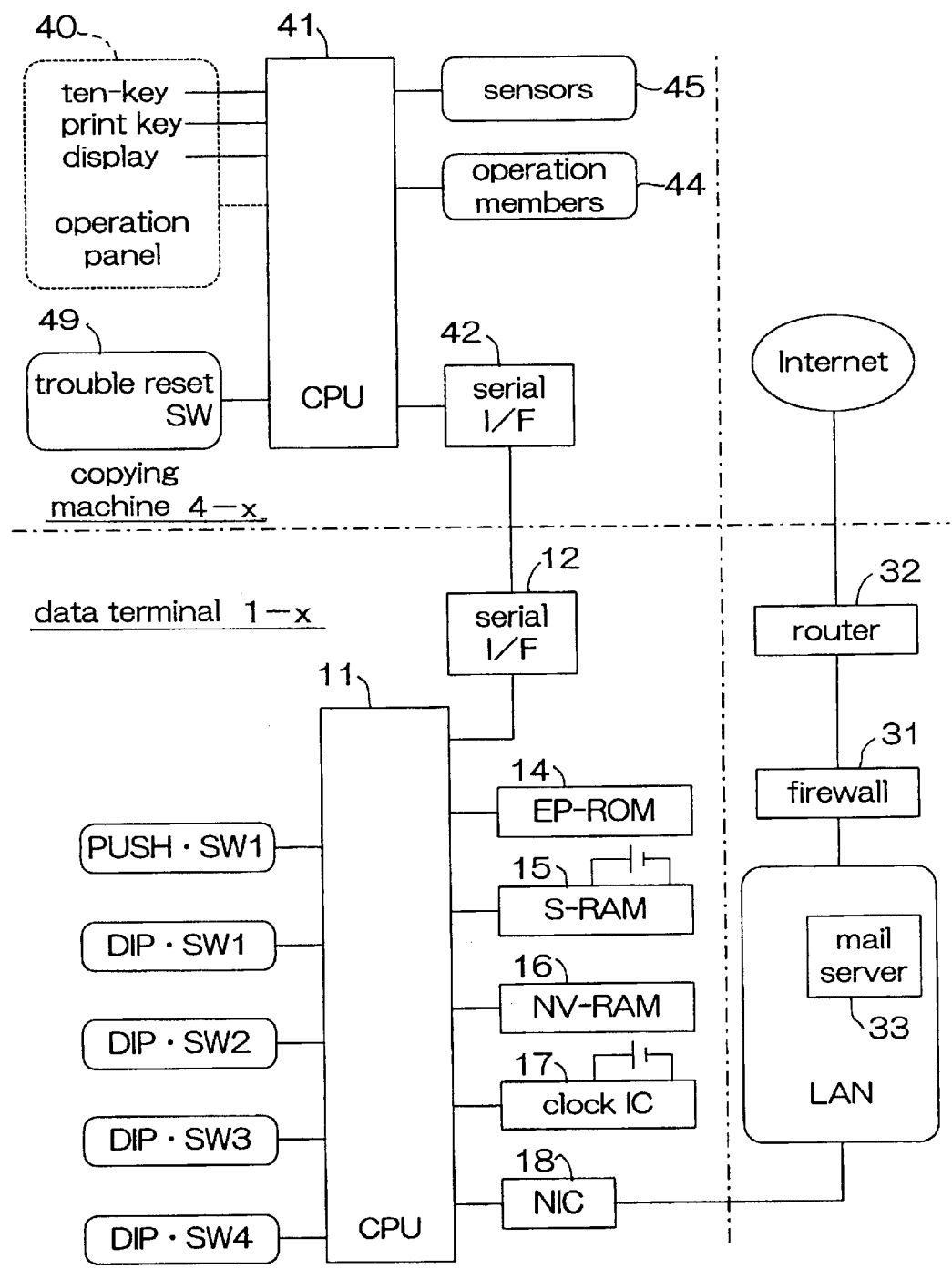
FIG. 2 is a block diagram showing part of the circuit configuration of the system.
Figure 3:
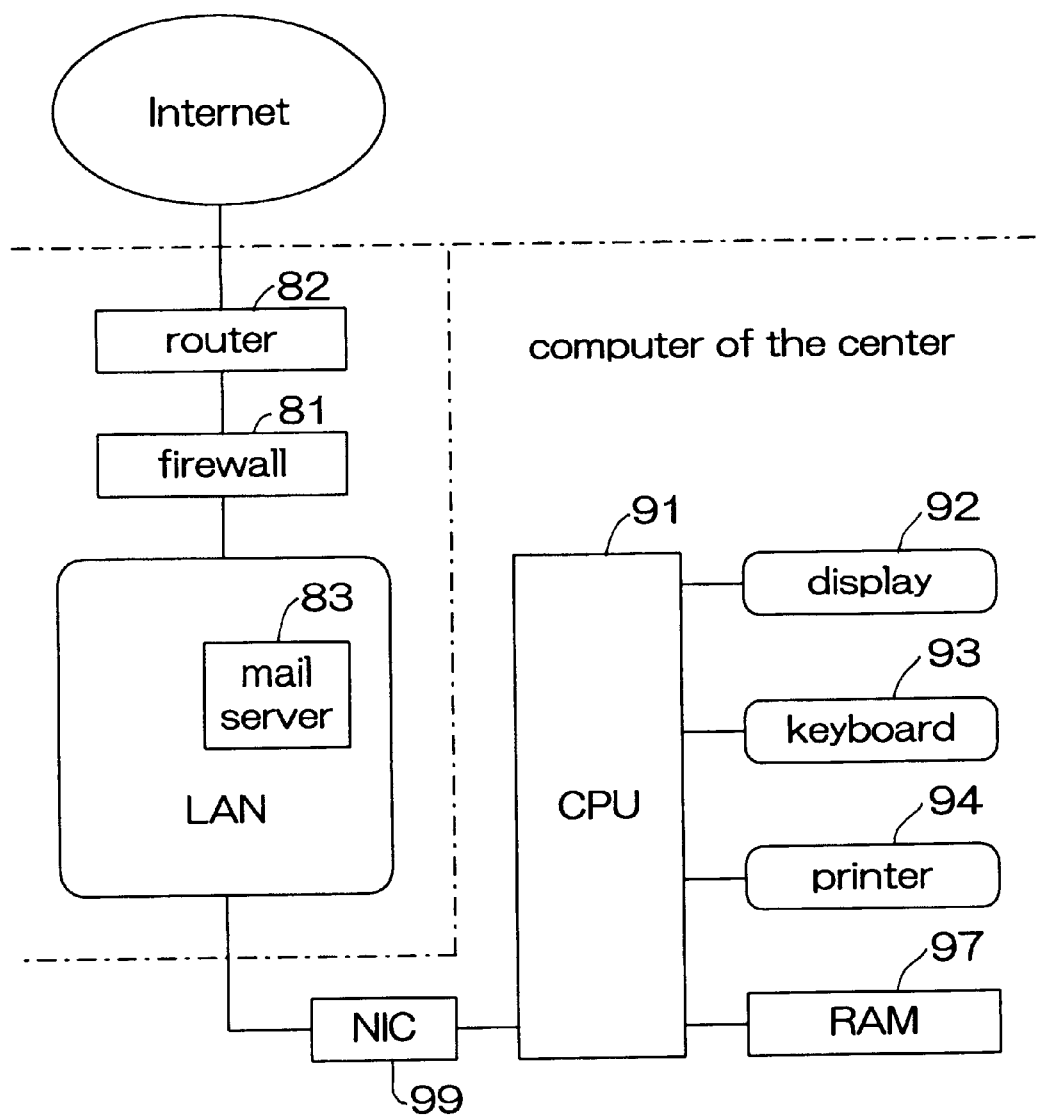
FIG. 3 is a block diagram showing the remaining part of the circuit configuration of the system.

FIG. 1 is an explanatory view of the configuration of the management system. FIGS. 2 and 3 are block diagrams of the management system. On the user's side, a copying machine 4-1, 4-2 and a data terminal 1-1, 1-2 are placed. The data terminal 1-x incorporates an NIC (network interface card) having a function to transmit and receive electric mails via the Internet. The data terminal 1-x is connected to a firewall 31 via a LAN (local-area network) and is connected to the Internet via a router 32. To the LAN, a mail server 33 that holds Internet mails is connected.

The data terminal 1-x takes in various pieces of information on the copying machine 4-x, performs predetermined processing on the information, and transmits it to a center side computer 90. On the side of the center, various diagnoses of the copying machine 4-x are performed based on the data transmitted from the data terminal 1-x, and copying machine management data is summed up.

On the side of the center, the computer 90 is provided. The computer 90 is provided with a CPU 91, and a display 92 and a keyboard 93 are connected to the computer 90. To communicate with the data terminal 1-x, the computer 90 is connected to a firewall 81 via a LAN and is connected to the Internet via a router 82. To the LAN, a mail server 83 that holds Internet mails are connected.

These apparatus and devices will be described.

[1-1] Copying machine

The copying machine 4-x scans an original image and forms a copy image on paper. A CPU 41 of the copying machine 4-x counts the count values of counters based on which the center calculates the amount billed for copying, and the count values are transmitted to a CPU 11 of the data terminal 1-x via a serial I/F (interface) 42 and a serial I/F 12. The counters are as follows: a total counter indicating the number of times of paper ejection; a sheet-size-specific counter indicating the number of used sheets of paper of each sheet size; a counter serving as a guide for maintenance; a portion-specific jam counter indicating the number of times of paper jam occurrence in each portion; a portion-specific trouble counter indicating the number of times of trouble occurrence in each portion; and a PM counter serving as a guide for performing the periodical maintenance of each part. The PM counter counts the number of times of use of each part, and the count value thereof serves, for example, as a guide for the timing of part replacement.

At the copying machine 4-x, various element data (for example, the time necessary for paper conveyance, the surface potential of the photoconductor drum, the concentration of the toner in the developer, the exposure amount of the photoconductor drum, the development bias voltage, the amount of the toner adhering to the surface of the photoconductor drum, and the grid voltage of the charger) that affect the image forming process are detected by various kinds of sensors 45 disposed in various portions of the copying machine 4-x, and are taken in the CPU 41 and processed. Then, the processed data are transmitted to the CPU 11 of the data terminal 1-x via the serial I/F 42 and the serial I/F 12.

[1-2] Data Terminal

The data terminal 1-x is an apparatus management unit that receives data transmitted from the copying machine 4-x via the serial I/F 42 and the serial I/F 12, and when a predetermined transmission condition (a condition for a transmission flag to be set; details thereof will be described later) is satisfied, activates an NIC 18 and transmits, as packets, copying machine management data (the above-mentioned element data, count data or the like) to which the address of the CPU 91 of the center is added.

Figure 4A:
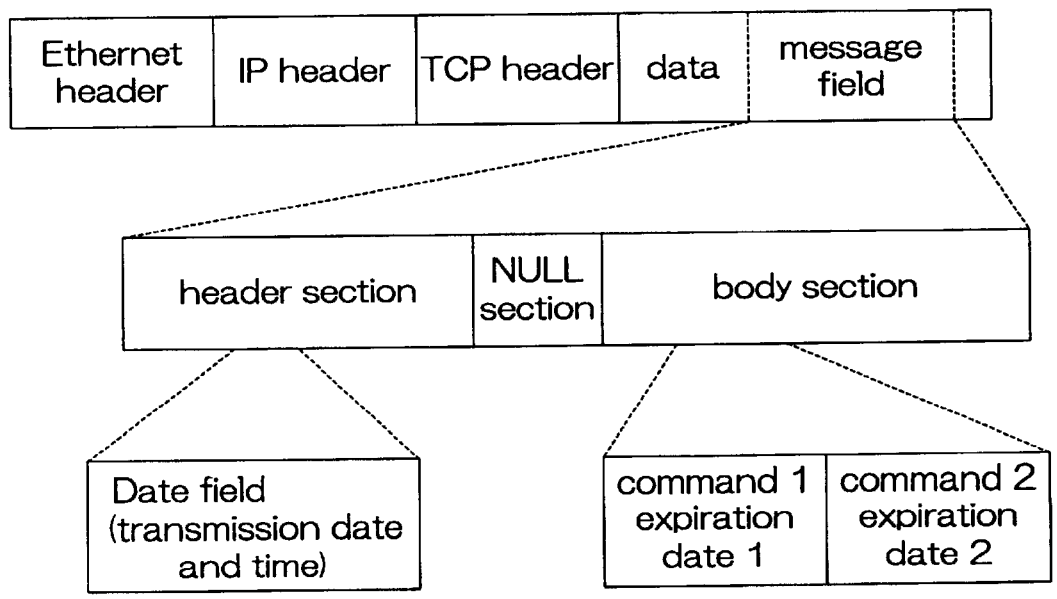
FIG. 4(a) is an explanatory view showing the configuration of packet data transmitted and received between a data terminal and a centralized management unit of a center.

The data configuration of the packet data is shown in FIG. 4(a).

As shown in the figure, the packet data comprises an Ethernet header, an IP header, a TCP header and a data section. The Ethernet header, the IP header and the TCP header include the information shown in the figure. The data section includes a message field. The message field includes a header section, a body section and a null line (blank) situated therebetween. The header section includes a date field where the transmission date and time is written. In the body section, arbitrary data may be written. For example, in the case of a packet transmitted from the center to a certain data terminal 1-x, a command and expiration date and time information corresponding to the command may be written in the body section.

To the CPU 11 of the data terminal 1-x are connected a ROM (read only memory) 14 in which a control program is stored, a nonvolatile memory 16 for storing the mail address of the center and the like therein, a battery-backed working system RAM (random-access memory) 15, and a battery-backed clock IC (integrated circuit) 17.

The CPU 11 receives the data transmitted from the CPU 41 of the copying machine 4-x via the serial I/F 42 and the serial I/F 12, and performs predetermined processing thereon. The CPU 11 also performs a predetermined operation, sets a predetermined mode or the like in accordance with an operation input from operation switches (push switch PUSHSW1 and four dip switches DIPSW1 to DIPSW4). The dip switch DIPSW1 is for setting a mode to input the mail address of the computer 90 of the center. The dip switch DIPSW2 is for setting a mode to input the ID (identification) number for identifying the data terminal 1-x (DTID). The dip switch DIPSW3 is for setting a mode to input the ID number for identifying the center (center ID). The dip switch DIPSW4 is for setting an initial setting mode. The push switch PUSHSW1 is for commanding the execution of initial transmission or user transmission described later.

Figure 4B:
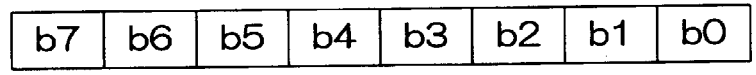
FIG. 4(b) is an explanatory view of a code transmitted from a copier to the data terminal.

Eight-bit data comprising bits b7 to b0 and being input from the serial I/F 12 to the data terminal 1-x is configured as shown in FIG. 4(b). That is, a paper ejection code representing the ejection of paper is expressed by the falling edge (the change from 1 to 0) of the bit b0. A jam code representing the occurrence of paper jam is expressed by the bit b7=1 and the bit b6=0. A trouble code representing the occurrence of a trouble is expressed by the bit b7=1 and the bit b6=1. The 8-bit data is periodically input to the data terminal 1-x, and is also input when paper jam or a trouble occurs at the copying machine 4-x.

The control CPU 11 is capable of commanding the NIC 18 to transmit an Internet mail to the mail address of the center. The content of the data (data for managing the copying machine 4-x) transmitted from the control CPU 11 to the center side CPU 91 is dependent on the kind of the set transmission flag as described later.

[1-3] Center

The center is a computer apparatus capable of transmitting and receiving packet data via the Internet to and from each of the data terminals 1-x provided in a multiplicity of users, copying machines. The computer apparatus is also connected to the Internet via a LAN. The copying machines 4-x connected to the user's data terminals 1-x are managed by the center.

[2] Control

The control performed by the management system will be described with reference to flowcharts. Here, phrases "on edge" and "off edge" are defined. A condition change where the condition of a switch, a sensor, a signal or the like is changed from off to on will be referred to as "on edge", and a condition change where the condition of a switch, a sensor, a signal or the like is changed from on to off will be referred to as "off edge".

[2-1] Processing at Copying machine 4-x

Figure 5:
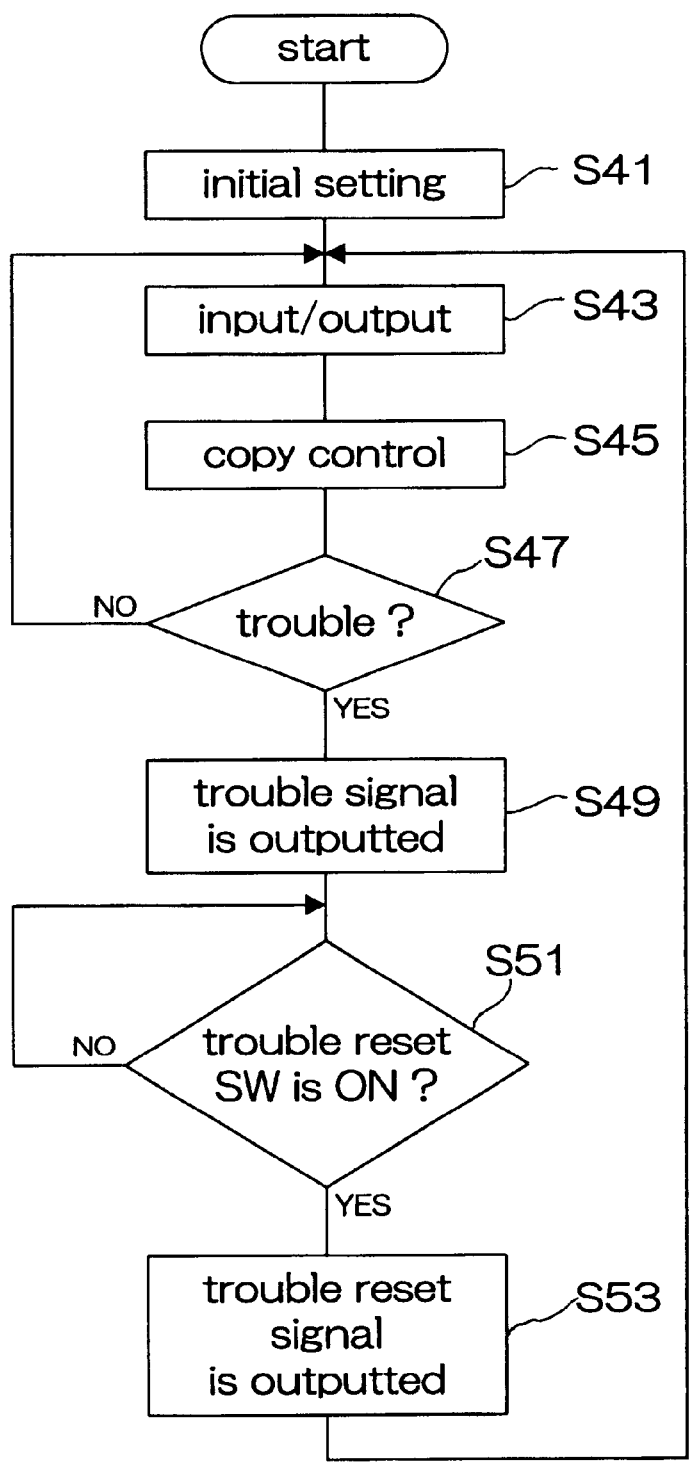
FIG. 5 is a flowchart showing the main routine of the processing performed by a CPU 41 of a copier 4-x.

FIG. 5 shows the processing performed by the CPU 41 of the copying machine 4-x. At the CPU 41, the processing is started by turning on the power or the like. First, initial setting such as memory clearing and standard mode setting is performed (step S41), and then, steps S43 and S45 are repeated as long as no trouble occurs.

Step S43 includes processing to accept input signals and communication with the data terminal 1-x. The input signals include, for example, input signals from key switches on an operation panel 40 of the copying machine and the sensors 45 in various portions of the copying machine 4-x. In the communication with the data terminal 1-x, a command to change a copying machine setting condition, a command to request an operation and the like are transmitted from the data terminal 1-x. From the copying machine 4-x, the element data and the count values are transmitted to the data terminal 1-x.

Step S45 includes processing necessary for copying or the like, for example, control of operation members 44 such as control of paper feed, control of exposure and scanning of an original, control of the members disposed around the photoconductor drum and control of the developer unit. Step S45 also includes processing for changing setting or performing an operation based on the above-mentioned command transmitted from the data terminal 1-x.

When a trouble such as faulty paper conveyance (paper jam) or faulty control or operation of the apparatus occurs (YES of step S47), a signal corresponding to the occurring trouble is transmitted to the CPU 11 (step S49). When a trouble reset switch 49 is operated by an operator or the like (YES of S51), a trouble reset signal is transmitted to the CPU 11 (step S53). In response thereto, the CPU 11 performs processing described later.

[2-2] Processing at Data terminal 1-x

Figure 6:
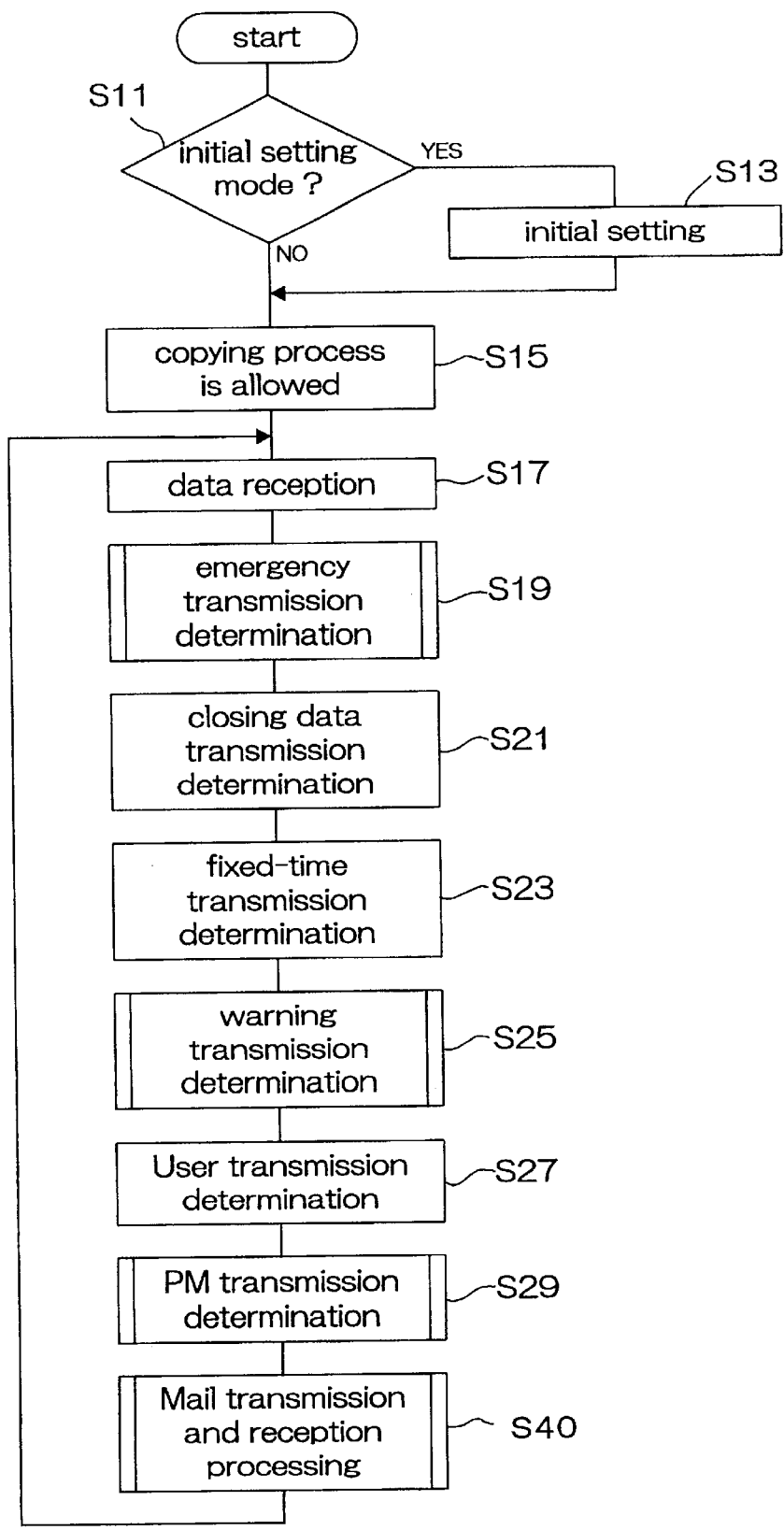
FIG. 6 is a flowchart showing the main routine of the processing performed by a CPU 11 of a data terminal 1-x.

FIGS. 6 to 13 show the processing performed by the CPU 11 of the data terminal 1-x. FIG. 6 shows the main routine.

At the CPU 11, the processing is started by turning on the power. When the initial setting mode is set (YES of step S11), initial setting processing (step S13) is performed, and then, a copy enabling signal is transmitted to the CPU 41 of the copying machine (step S15). When the initial setting mode is not set (NO of step S11), the copy enabling signal is immediately transmitted (step S15). After step S15, steps S17 to S40 are repeated.

[2-2-1] Summary of Processing at Steps of FIG. 6

(a) Initial Setting (Step S13)

This processing is performed when the dip switch DIPSW4 is on at the point of time when the processing at the data terminal 1-x is started, that is, when the initial mode is set (YES of step S11). In the initial setting processing, the mail address of the center, the ID number of the data terminal 1-x (DTID) and the ID number of the center (center ID) are set and initial transmission is performed.

(b) Data Reception (Step S17)

Processing to receive various data on the condition of the copying machine transmitted from the CPU 41 is performed. The contents of the data are as follows: the paper ejection code; the jam/trouble code; the jam/trouble count value; the sheet-size-specific count value; the PM count value; and the element data value. The CPU 11 always holds the latest values of these data.

(c) Emergency Transmission Determination (Step S19)

Determination as to whether to transmit trouble data or trouble recovery data to the center or not or is made. Details will be given later.

(d) Closing Date Transmission Determination (Step S21)

When a predetermined closing date and time of a billing period comes, a closing date transmission flag is set. Consequently, the total count value and the sheet-size-specific count value based on which the amount billed for copying is calculated are transmitted to the center. After the transmission is finished, the next closing date transmission date and time data is returned from the center.

(e) Fixed-Time Transmission Determination (Step S23)

When a predetermined fixed-time transmission time comes, a fixed-time transmission flag is set. Consequently, the above-mentioned data on the condition of the copying machine are transmitted to the center. After the transmission is finished, the current time data and the next fixed-time transmission date and time data are returned from the center.

(f) Warning Transmission Determination (Step S25)

As described later, the element data, the count value of the jam counter and the count value of the PM counter are compared with predetermined threshold values. Based on the result of the comparison, it is determined whether to transmit warning data or warning cancel data to the center or not.

(g) User Transmission Determination (Step S27)

In the case where the initial setting mode is not set, when the push switch PUSHSW1 is depressed, a user transmission flag is set. Consequently, the above-mentioned data on the condition of the copying machine are transmitted to the center.

(h) PM Transmission Determination (Step S29)

As described later, the count value of the PM counter before the PM counter is cleared to 0 because of part replacement is transmitted to the center.

(i) Mail Transmission and Reception Processing (Step S40)

When any of the transmission flags is set, Internet mail transmission and reception to and from the center is performed. Details of the mail transmission and reception processing will be given later.

Figure 7:
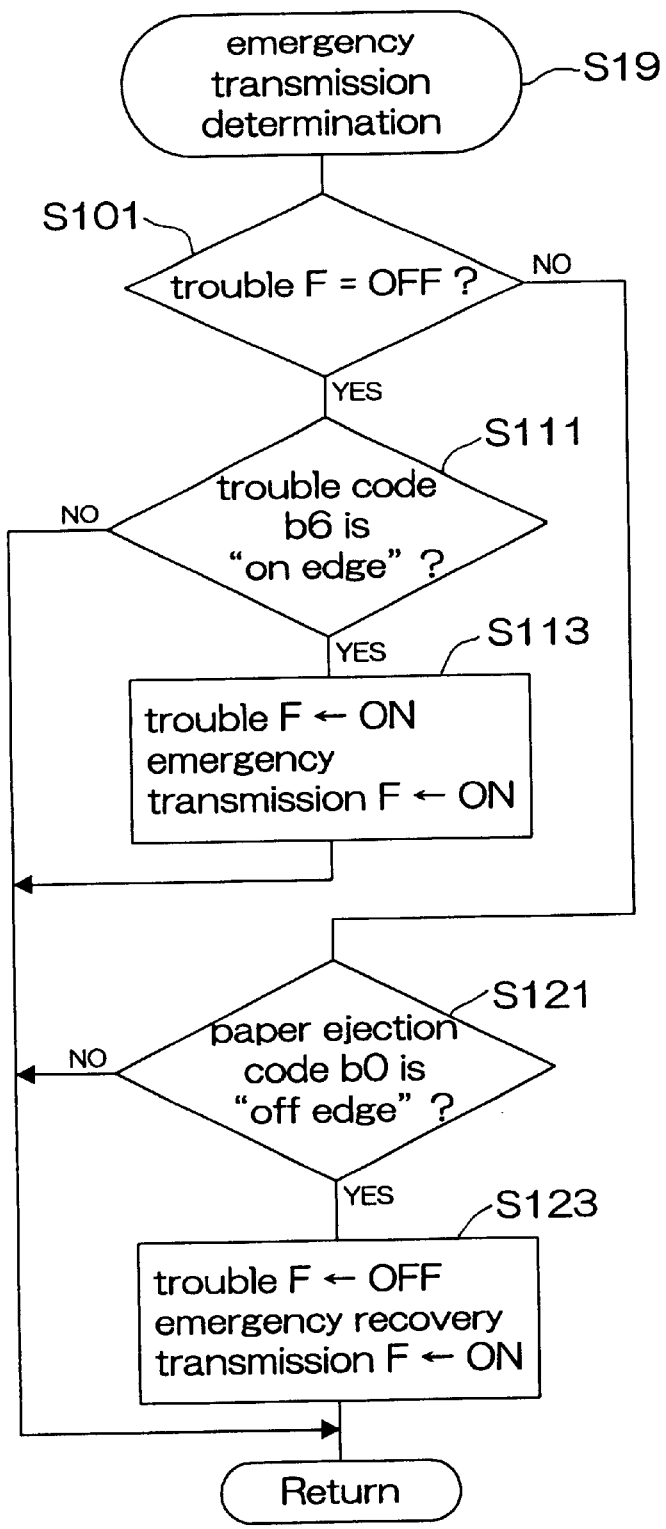
FIG. 7 is a flowchart showing the emergency transmission determination processing in FIG. 6.

[2-2-2] Emergency Transmission Determination (FIG. 7)

In this processing, emergency transmission and emergency recovery transmission are managed.

For example, when the "on edge" of the trouble code b6 from the copying machine is detected (YES of step S111) with a trouble flag being off (YES of step S101), the trouble flag and an emergency transmission flag are set (step S113).

When the "off edge" of the paper ejection code b0 from the copying machine is detected (YES of step S121) with the trouble flag being on (NO of step S101), the trouble flag is reset and an emergency recovery transmission flag is set (step S123). Processing is performed in this manner because it is when the trouble is removed that paper is ejected from the copying machine.

When the emergency transmission flag or the emergency recovery transmission flag is set, the mail transmission and reception processing (S40) is performed, so that trouble data or trouble recovery data is transmitted to the CPU 91 of the center.

Figure 8:
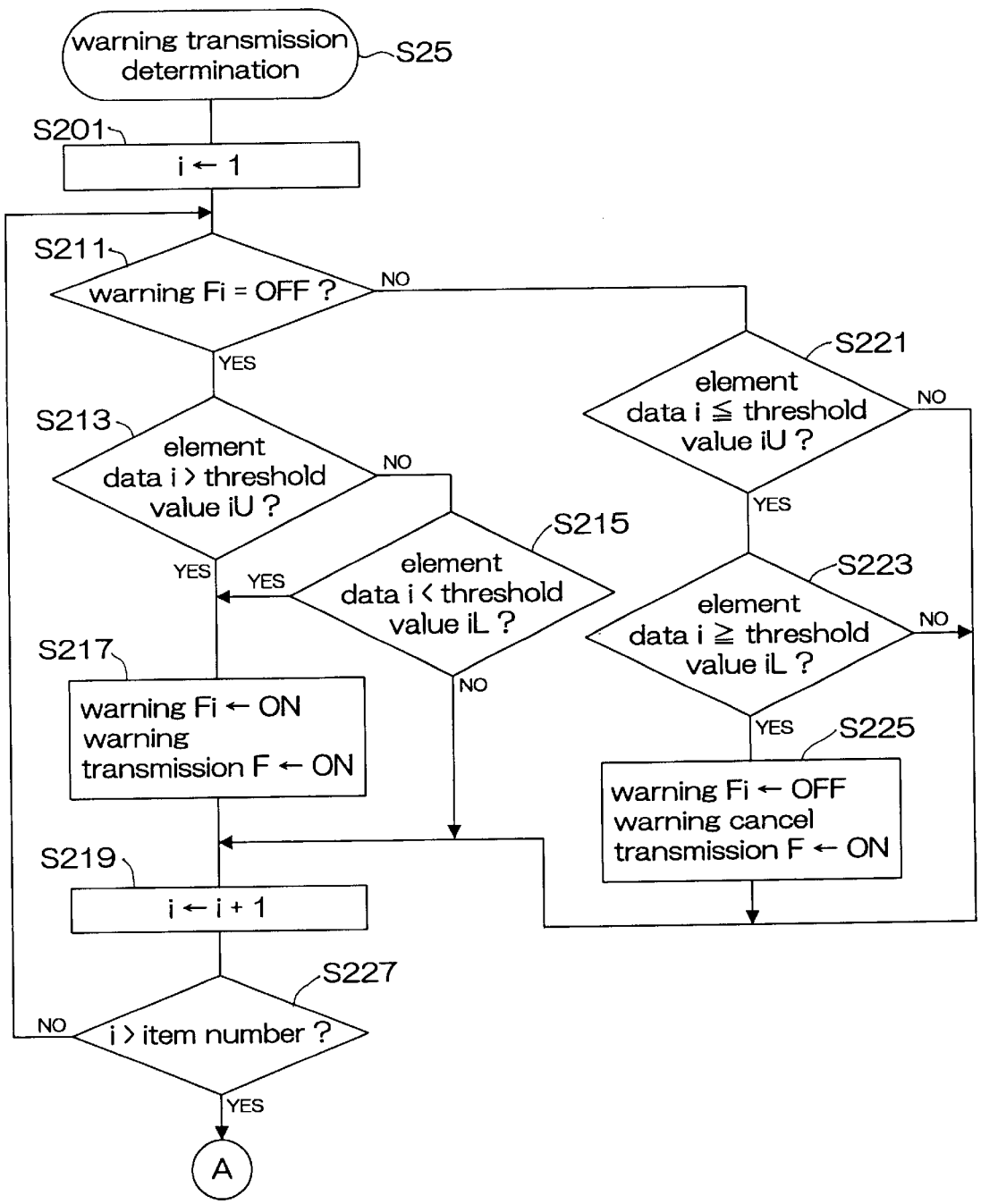
FIG. 8 is part of a flowchart showing the warning transmission determination processing in FIG. 6.
Figure 9:
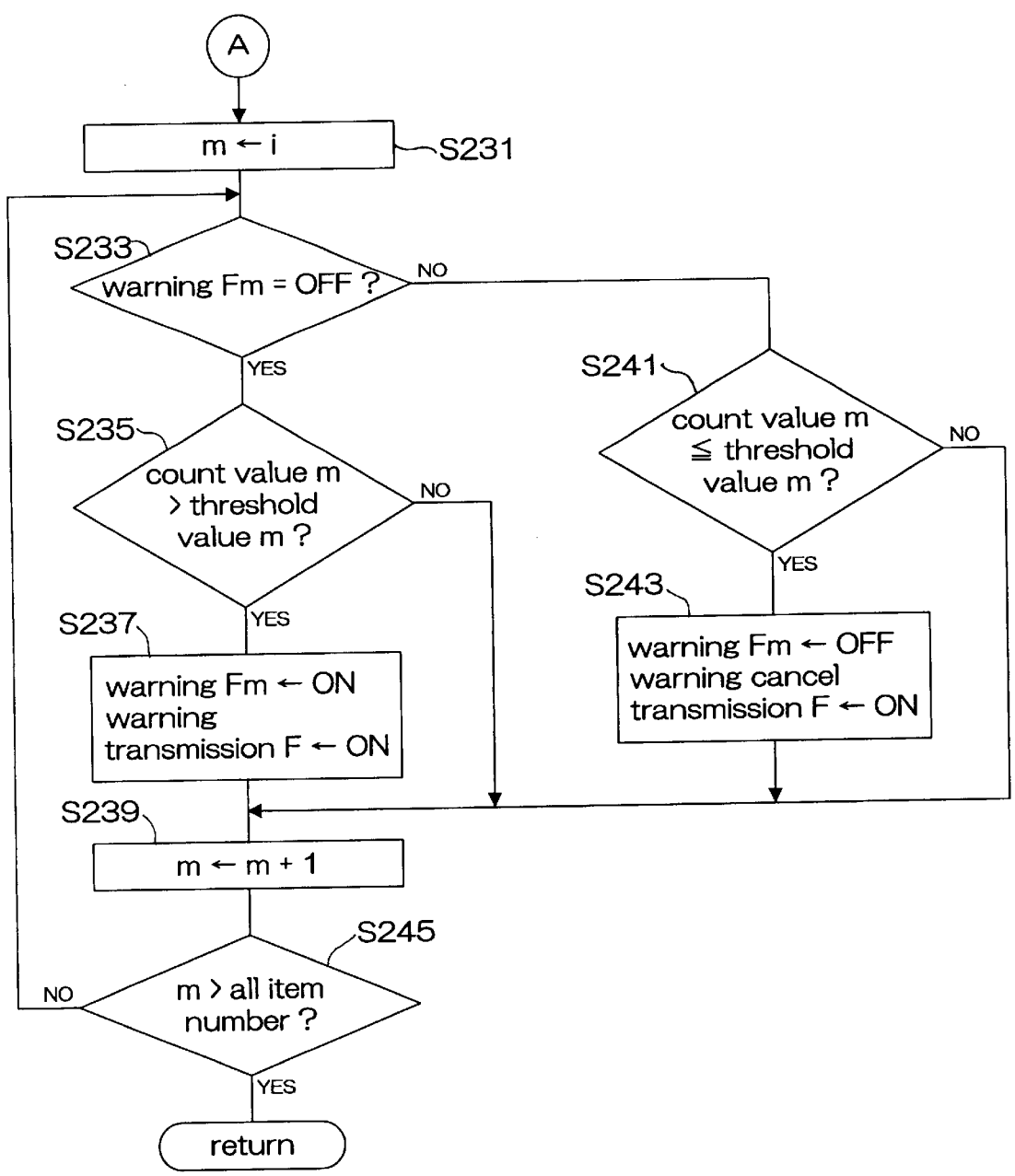
FIG. 9 is the remaining part of the flowchart showing the warning transmission determination processing in FIG. 6.

[2-2-3] Warning Transmission Determination (FIGS. 8 to 9)

In this processing, warning transmission and warning cancel transmission are managed.

Steps S201 to S227 are processing to perform warning transmission when the value of element data is outside the permissible range particular to the element data and perform warning cancel transmission when the value recovers to a value within the permissible range.

First, an initial value "1" is set as an item number i representing the kind of the element data (step S201). Then, at step S211, the condition of the warning flag associated with the element data specified by the item number i (for the first time around, the element data of the first item) is determined. When it is determined that the warning flag associated with the element data is off (YES of step S211), it is determined whether or not the value of the element data is within the permissible range particular to the element data, in other words, whether or not it is within a range of not more than an upper limit threshold value iU and not less than a lower limit threshold value iL. When it is determined that the value is outside the permissible range (YES of step S213, or YES of step S215), a warning flag Fi associated with the element data and a warning transmission flag are set (step S217). Consequently, the mail transmission and reception processing (S40) is performed to transmit warning data to the center.

When it is determined at step S211 that the warning flag of the element data specified by the item number i is on (NO of step S211), it is determined whether the value of the element data has recovered to a value within the permissible range or not. When it is determined that the value has recovered (YES of S221 and YES of S223), the warning flag Fi associated with the element data is reset, and a warning cancel transmission flag is set (step S225). Consequently, the mail transmission and reception processing (S40) is performed to transmit the warning cancel data to the center.

When the above-described processing is performed on all the element data (YES of step S227), the processing from step S231 is performed.

Steps S231 to S245 are for performing warning transmission when the count values of the jam counter and the PM counter exceed threshold values particular thereto, and performing warning cancel transmission when the count values recover to values not more than the threshold values.

First, an initial value "i (the value of the last item number of the element data+1)" is set as an item number m representing the kind of the jam counter and the PM counter (step S231).

Then, at step S233, the condition of the warning flag associated with the jam counter or the PM counter specified by the item number m is determined. When it is determined that the warning flag associated with the jam counter or the PM counter is off (YES of step S233), it is determined whether the count value is within the permissible range particular to the counter or not, that is, whether the count value does not exceed a threshold value m or not. When it is determined that the count value exceeds the threshold value m (YES of step S235), a warning flag Fm associated with the counter and the warning transmission flag are set (step S237). In response thereto, the mail transmission and reception processing (S40) is performed to transmit the warning data to the CPU 91 of the center.

When it is determined at step S233 that the warning flag associated with the jam counter or the PM counter specified by the item number m is on (NO of step S233), it is determined whether or not the count value has recovered to a value not more than the threshold value. When it is determined that the value has recovered (YES of step S241), the warning flag Fm associated with the counter is reset, and the warning cancel transmission flag is set. In response thereto, the mail transmission and reception processing (S40) is performed to transmit the warning cancel data to the CPU 91 of the center.

When the above-described processing is performed on all the jam and PM counters (YES of step S245), the process returns to the main routine.

Warning transmission and warning cancel transmission are managed in this manner.

Figure 10:
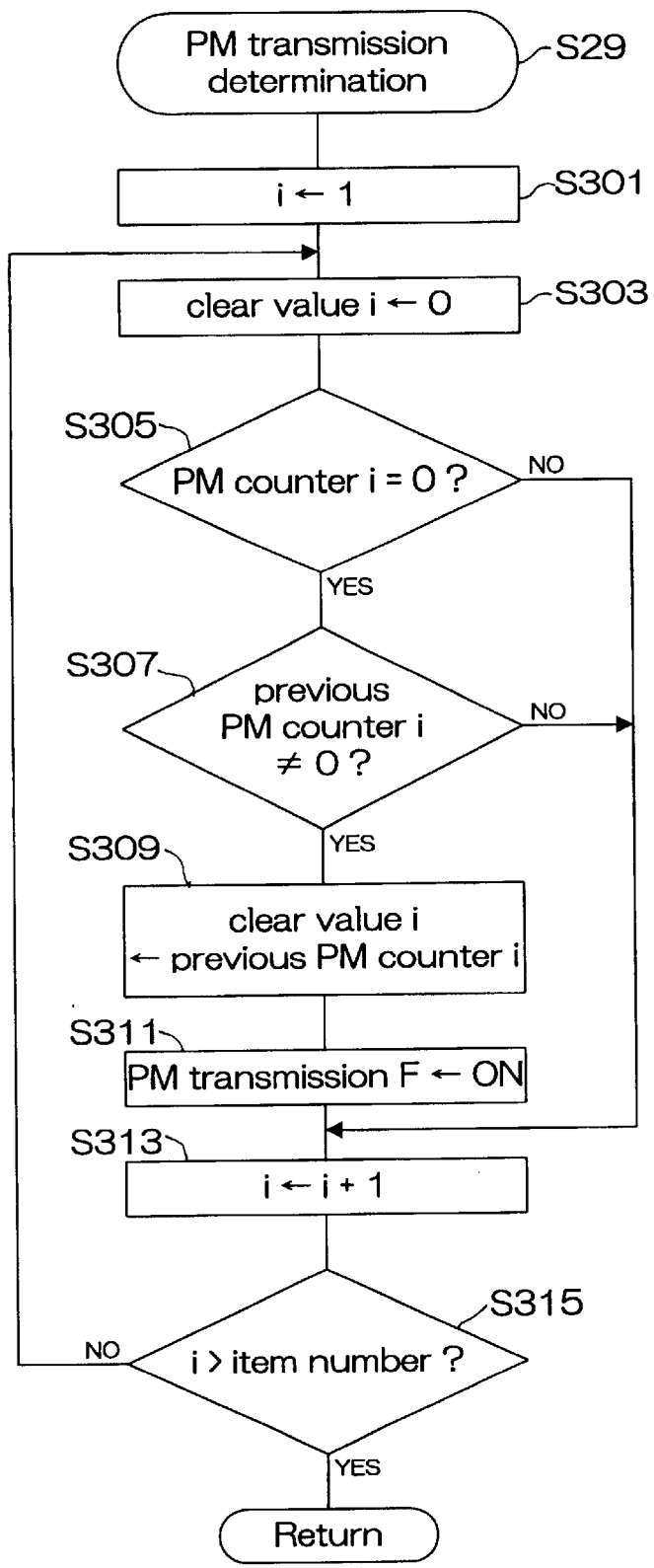
FIG. 10 is a flowchart showing the PM transmission determination processing in FIG. 6.

[2-2-4] PM Transmission Determination (FIG. 10)

In this processing, PM transmission is managed.

First, the initial value "1" is set as the item number i representing the kind of the PM counter (step S301). Then, steps S303 to S311 are performed. Thereafter, the value of i is incremented (step S313), and the above-described processing is repeated. That is, the above-described processing is repetitively performed successively on different kinds of PM counters.

Steps S303 to S311 are for, when the PM counter is cleared (YES of step S305 and YES of step S307), saving the count value of the PM counter immediately before the PM counter is cleared (step S309), and setting a PM transmission flag (step S311). The PM counter is cleared by the serviceperson when the part corresponding to the PM counter is replaced.

When the PM transmission flag is set (step S311), the mail transmission and reception processing (S40) is performed to transmit PM data (the kind of the replaced part and the counter value immediately before the replacement) to the center.

Figure 11:
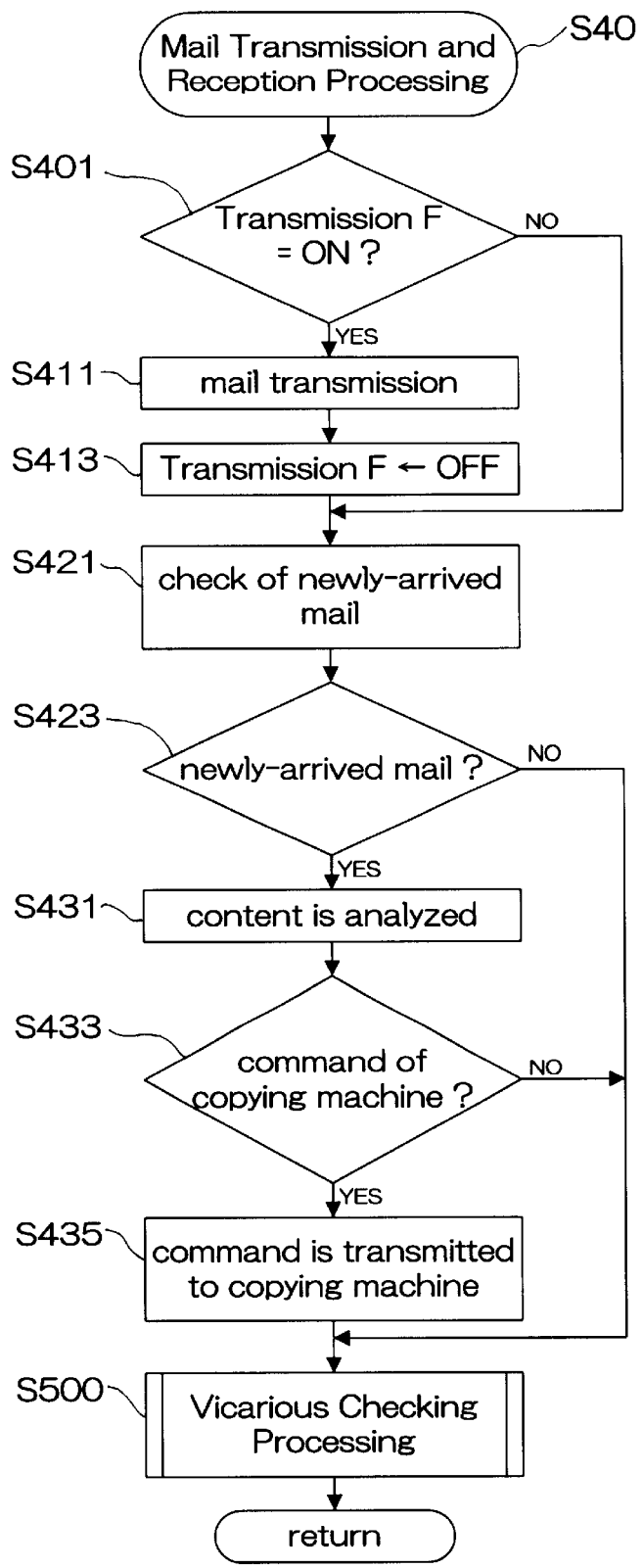
FIG. 11 is a flowchart showing the mail transmission and reception processing in FIG. 6.
Figure 13:
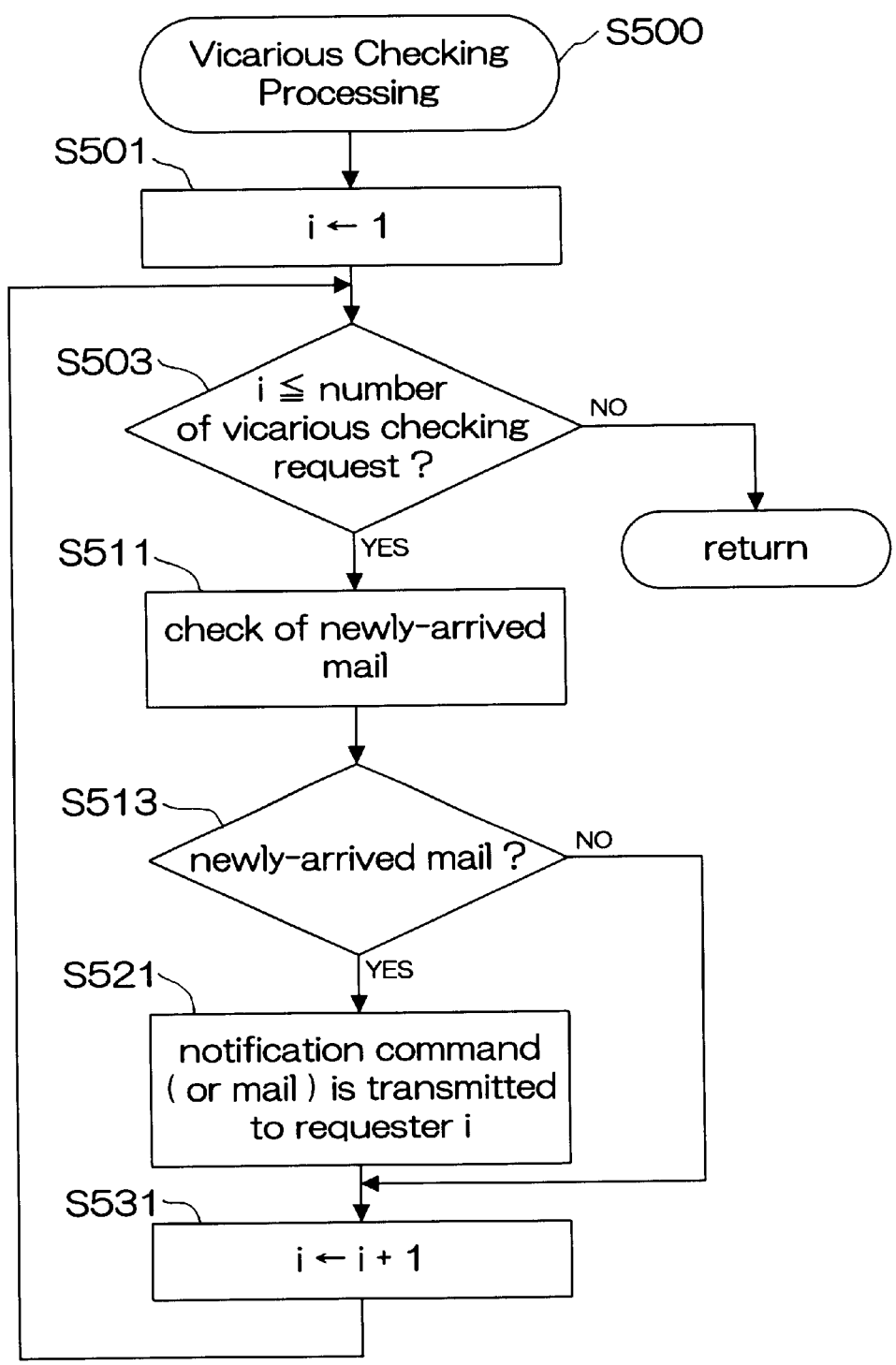
FIG. 13 is a flowchart showing the vicarious checking processing in FIG. 11.

[2-2-5] Mail Transmission and Reception Processing (FIGS. 11 to 13)

When any of the transmission flags is set at the data terminal 1-x, the data corresponding to the transmission flag is sent out to the Internet as packet data to which the address of the center is added. Moreover, packet data transmitted from the center to the data terminal 1-x is read.

First, when any of the transmission flags is set (YES of step S401), the data corresponding to the set transmission flag is transmitted to the center as an Internet mail (step S411). That is, the data is sent out to the Internet as packet data to which the address of the center is added. Then, the transmission flag is reset (step S413). When the transmission of the mail is a failure, the mail is re-transmitted (not shown).

At step S421, whether there is a newly-arrived mail addressed to the data terminal 1-x or not is read from the mail server 33. When there is a newly-arrived mail addressed to the data terminal 1-x (YES of step S423), the mail is r ad from the mail server 33 and the content of the mail is analyzed (step S431). A mail transmitted from the center to the data terminal 1-x includes, for example, a command to change the setting condition of the copier (setting change command), a command to request the copier to operate (operation command), the current time, the next fixed-time transmission date and time, or the next closing date transmission date and time. When there is no newly-arrived mail addressed to the data terminal 1-x (NO of step S423), the mail transmission and reception processing is finished.

When it is determined as a result of the analysis at step S431 that the setting change command or the operation command is included in the mail (YES of step S433), the command and its parameters are transmitted to the CPU 41 via the serial I/F 12 and the serial I/F 42 (step S435). Consequently, the processing corresponding to the command is performed at the copier 4-x by the processing of step S43. When neither the setting change command nor the operation command is included in the mail read at step S431 (NO of step S433), after subsequently-described newly-arrived mail vicarious checking processing is performed, the mail transmission and reception processing is finished.

[2-2-5-1] Vicarious Checking (FIGS. 12 to 13)

The vicarious checking processing (S500) in the mail transmission and reception processing (S40) will be described. At the request of another data terminal connected to the LAN, the common mail server 33 is checked to see if there is a newly-arrived mail addressed to the data terminal. Here, an example will be described in which a data terminal 1-1 requests vicarious checking of newly-arrived mails of a data terminal 1-2.

(a) Request for Vicarious Checking

First, the data terminal 1-1 explains to the data terminal 1-2 the processing to request vicarious checking of newly-arrived mails.

The data terminal 1-1 requests vicarious checking of newly-arrived mails of the data terminal 1-2 immediately before the data terminal 1-1 is placed in the sleep mode (prior to the placement of the data terminal 1-1 in the sleep mode). For example, as a terminal of which the data terminal 1-1 requests vicarious checking, the IP address of the data terminal 1-2 is previously registered in a memory of the data terminal 1-1. Based on the IP address, a command to request vicarious checking is transmitted from the data terminal 1-1 to the data terminal 1-2 via the LAN.

Here, the sleep mode is a low-power-consumption mode of bringing functions other than minimum necessary functions into sleep state (stopped state), and is set by the CPU 11 after the apparatus or the apparatus management unit is idle for more than a predetermined time.

At this time, the data terminal 1-1 notifies the data terminal 1-2 of its account name and password for the mail server 33 and its IP address as parameters of the vicarious checking request command. The data terminal 1-2 having received the vicarious checking request command registers the account name and the password for the mail server 33 and the IP address of the data terminal 1-1 transmitted together with the command in a vicarious checking request list as shown in FIG. 12.

These processings are performed by the CPU 11 of each of the data terminals 1-1 and 1-2.

(b) Vicarious Checking Processing

The processing for the data terminal 1-2 requested to perform vicarious checking to actually perform vicarious checking will be described with reference to the flowchart shown in FIG. 13.

First, the data terminal 1-2 sets the initial value "1" to an index i representing the request number of the vicarious checking request (step S501). Then, the data terminal 1-2 determines whether or not the index i is not more than the number of vicarious checking requests with reference to the vicarious checking request list (FIG. 12) (step S503).

When the value of the index i is not more than the number of vicarious checking requests (YES of step S503), the data terminal 1-2 makes a connection to the mail server 33 by use of the account name and the password of the requester i, and determines whether there is a newly-arrived mail addressed to the requester i or not (step S511).

When it is determined that there is a newly-arrived mail addressed to the requester i (YES of step S513), the requester i is notified of that. For example, a mail reception notification command is transmitted to the IP address of the requester i registered in the vicarious checking request list (FIG. 12) via the LAN(S521). The management system may be configured so that not only the requester i is notified of the arrival of a mail addressed to the data terminal 1-1 but also the mail is read from the mail server 33 and transmitted to the data terminal 1-1.

Figure 14:
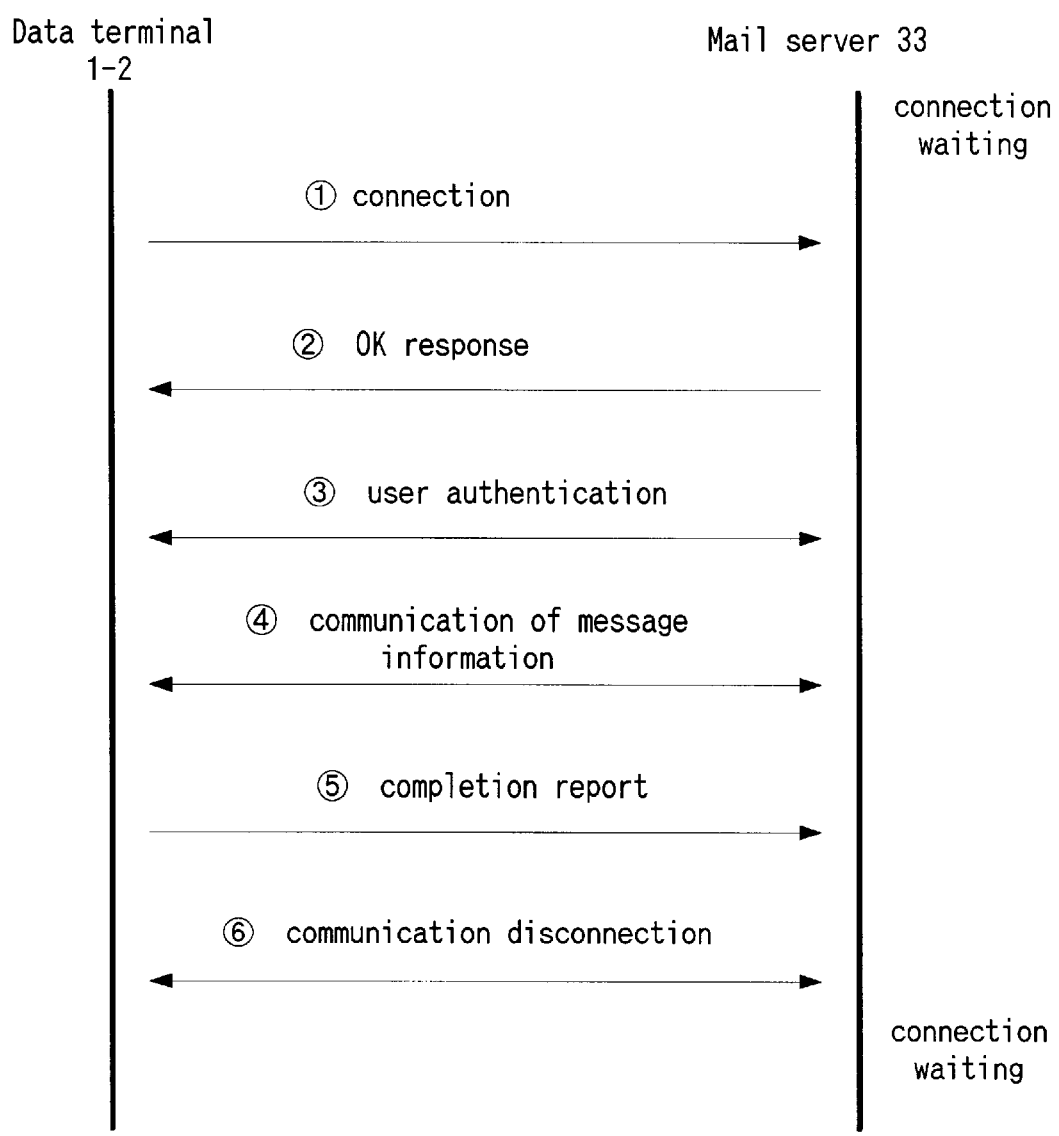
FIG. 14 shows the procedures of communication between a data terminal 1-2 performing vicarious checking and a mail server 33 in a case where only confirmation is made.
Figure 15:
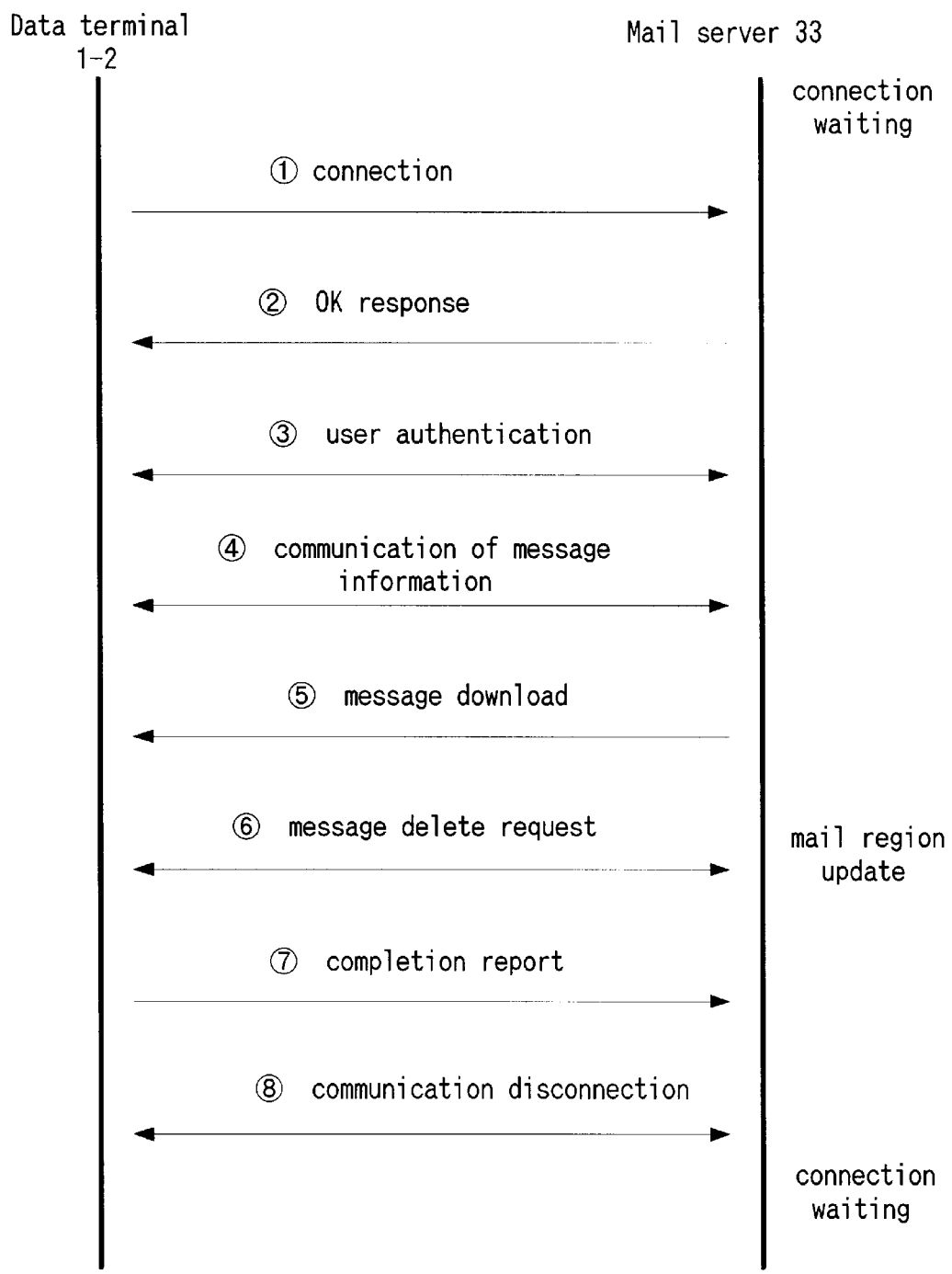
FIG. 15 shows the procedures of communication between the data terminal 1-2 performing vicarious checking and the mail server 33 in a case where mail reading is also performed.

The procedures of communication between the data terminal 1-2 and the mail server 33 in a case where the requester is notified of the arrival of a mail is shown in FIG. 14. The procedures of communication between the data terminal 1-2 and the mail server 33 in a case where the mail is transmitted to the requester together with the notification of the arrival of the mail is shown in FIG. 15.

By setting the data terminal 1-1 so as to be brought out of the sleep mode in response to the notification of the arrival of a mail (or reception of a mail from the data terminal 1-2), when the copier setting change command or the operation command is included in the mail whose arrival is notified the requester of (or in the mail transmitted from the data terminal 1-2), the setting change or the operation can be immediately performed.

At step S531, the index i is incremented, and the process returns to step S503. Consequently, the above-described processing (vicarious checking of newly-arrived mails, or notification given when there is a newly-arrived mail, etc.) is performed for the next requester.

When it is determined at step S503 that the index i exceeds the number of vicarious checking requests (NO of step S503), because this is when vicarious checking has been finished for all the requesters, the vicarious checking processing is finished.

(c) Cancellation of Vicarious Checking Request

When returning from the sleep mode, the data terminal 1-1 transmits via the LAN data representing cancellation of the vicarious checking of newly-arrived mails which the data terminal 1-1 requested the data terminal 1-2 to perform. Consequently, the data terminal 1-2 deletes the account name and the password for the mail server 33 and the IP address of the data terminal 1-1 from the vicarious checking request list (FIG. 12).

These processings are performed by the CPU 11 of each of the data terminals 1-1 and 1-2.

[2-3] Processing at Center

The processing performed by the CPU 91 provided in the computer 90 of the center will be described with reference to the flowcharts of FIGS. 16 and 17.

Figure 16:
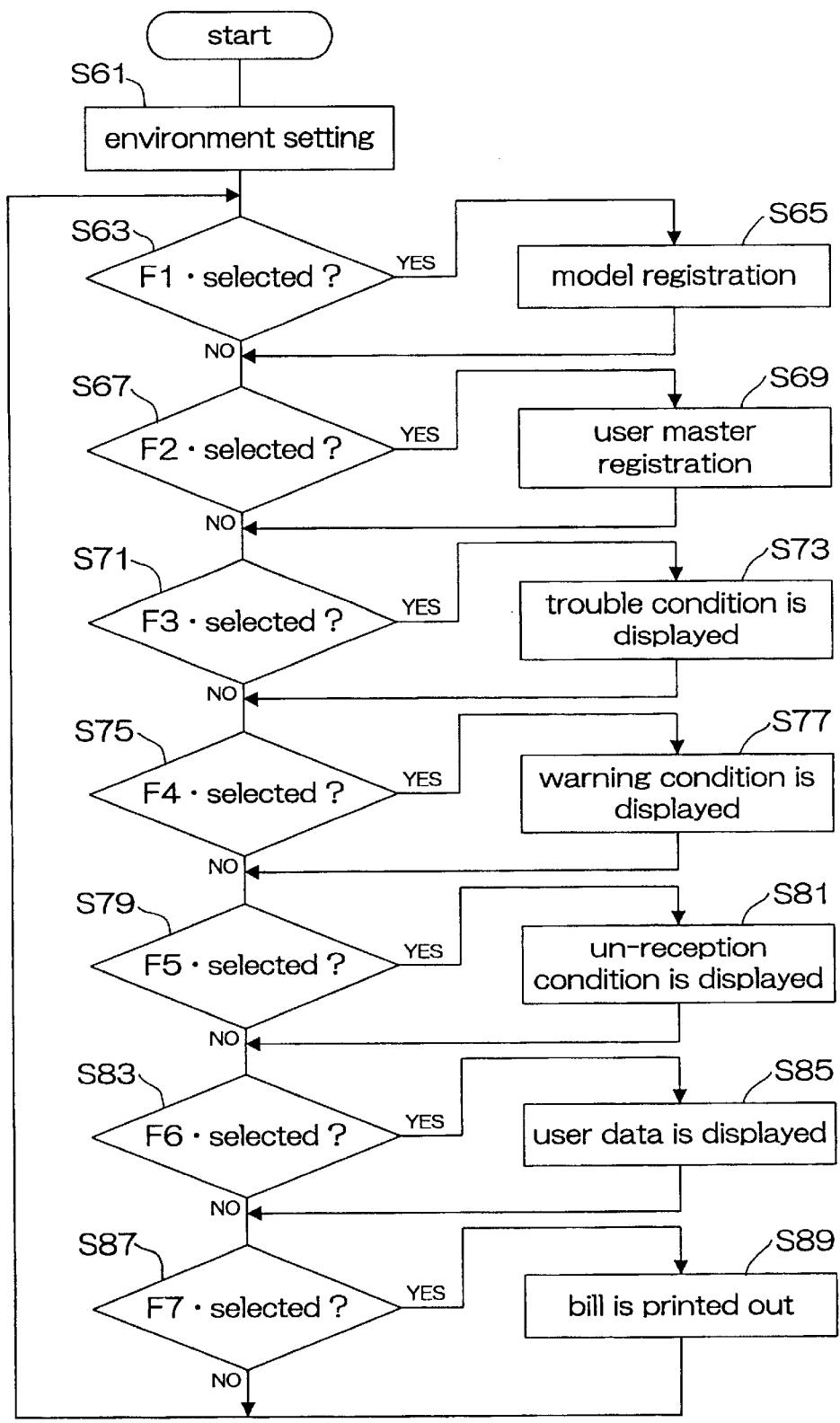
FIG. 16 is a flowchart showing processing performed by a CPU 91 of the center.

[2-3-1] F1 to F7 Key Processing (FIG. 16)

The CPU 91 starts the processing by turning on the power. First, general environment settings are made (step S61), and then, a subsequently-mentioned mode is set or a subsequently-described processing is performed in response to a key input operation of any of keys F1 to F7.

(a) F1 Key Operation (YES of Step S63)

A model registration acceptance mode is set (step S65). That is, new registration of the model name, the number of items of the element data, the names of the element data, the standard threshold values of the element data, the standard threshold values of the count data or the like is accepted.

(b) F2 Key Operation (YES of step S67)

A user master registration acceptance mode is set (step S69). That is, new registration of the user name, the address, the telephone number, the model name, the model number, the fixed-time transmission date and time or the like is accepted. Moreover, the ID of the data terminal (DTID) is automatically set.

(c) F3 Key Operation (YES of step S71)

The trouble condition is displayed (step S73). That is, information on the user of the copying machine that performed emergency transmission (the user name, the address, the telephone number and the model name), and the date and time of occurrence of the trouble together with the content of the trouble are shown on the display 92. Irrespective of the operation of the F3 key, the number of times of trouble occurrence is always shown in a corner of the display 92.

(d) F4 Key Operation (YES of step S75)

The warning condition is displayed (step S77). That is, the information on the user of the copying machine to which warning transmission is performed together with the content of the warning is shown on the display 92. Irrespective of the operation of the F4 key, the number of times of warning is always shown in a corner of the display 92.

(e) F5 Key Operation (YES of step S79) The un-reception condition is displayed (step S81). That is, the information on the user of the copying machine the fixed-time transmission from which is determined to be unreceived is displayed on the display 92. Irrespective of the operation of the F5 key, the number of unreceived fixed-time transmissions is always shown in a corner of the display 92.

(f) F6 Key Operation (YES of step S83)

A user data display mode is set (step S85). That is, when a user is selected, the information on the user is shown on the display 92. When a sub menu is selected, the count values of the counters (the total counter, the sheet-size-specific counter, the jam counter, the trouble counter and the PM counter) of the user's copying machine and the element data are shown month by month or item by item.

(g) F7 Key Operation (YES of step S87)

The bill is printed out (step S89). A printer (not shown) connected to the computer 90 is activated, and the amount billed for copying calculated based on the count value of the total counter and a predetermined calculation expression is printed out.

Figure 17:
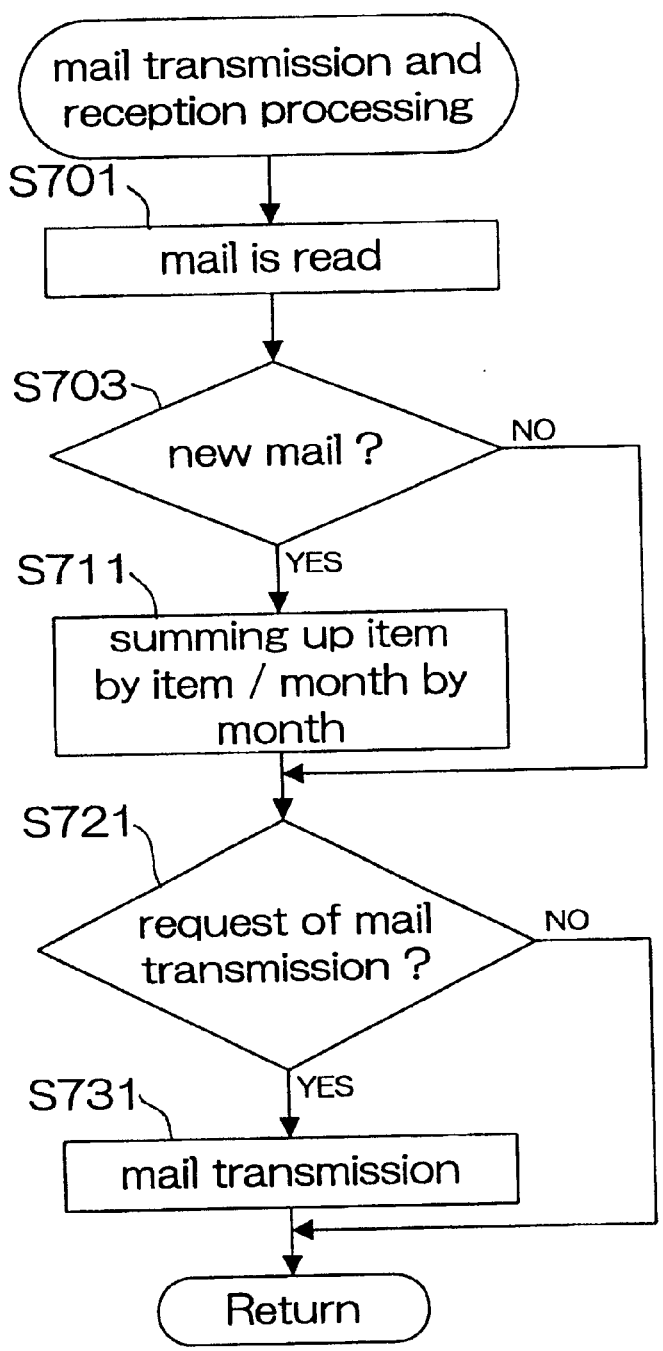
FIG. 17 is a flowchart showing the mail transmission and reception processing performed by the CPU of the center.

[2-3-2] Mail Transmission and Reception Processing (FIG. 17)

Processing for the center to transmit and receive mails to and from the data terminal 1-x connected to a certain copying machine 4-x will be described with reference to FIG. 17.

First, whether there is a newly-arrived mail addressed to the center or not is read from the mail server 83 of the center (step S701). When there is a newly-arrived mail addressed to the center (YES of step S703), the mail is read from the mail server 83, and based on the content of the mail, summing up is performed item by item or month by month. Consequently, data for image display by selection by the operator (see step S85 of FIG. 16) is produced (step S711).

At step S721, it is determined whether data to be transmitted to the copying machine 4-x is present or not. Examples of the data to be transmitted from the center to the copying machine 4-x include the command to change the setting condition of the copying machine 4-x (setting change command), the command to request the copying machine 4-x to operate (operation command), the current time, the next fixed-time transmission date and time, and the next closing date transmission date and time. When data to be transmitted is present (YES of step S721), the data is transmitted to the data terminal 1-x of the copying machine 4-x as an Internet mail (step S731). When data to be transmitted is absent, the mail transmission and reception processing is finished. When the transmission of the mail is a failure, the mail is re-transmitted (not shown).

Examples of apparatuses to be managed by the apparatus management units include copiers and printers. However, the present invention is not limited thereto.

Moreover, the apparatus and the apparatus management unit may be structured as separate units and connected, or may be structured as an integral unit. When they are structured as an integral unit, a portion functioning as the apparatus and a portion functioning as the apparatus management unit are provided. In that case, for example, the counting means may be common to the portions.

In this embodiment, an apparatus management unit requests another apparatus management unit connected to the LAN to perform vicarious checking of the presence or absence of a packet addressed to itself. The requested apparatus management unit checks the presence or absence of a packet addressed to the requester apparatus management unit, and when there is a packet, notifies the requester apparatus management unit of the presence of the packet via the LAN. Consequently, even in the sleep mode, the presence or absence of a mail addressed to an apparatus management unit can be checked and the mail can be taken in without any delay because the presence or absence of a packet addressed to the apparatus management unit is checked by another apparatus management unit.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An apparatus management unit that sends out a mail addressed to a centralized management unit to a communication network via a LAN, and takes in a mail addressed to said apparatus management unit from a mail server connected to the LAN, the apparatus management unit comprising:

accepting means for accepting a request, from a second apparatus management unit connected to the LAN, for vicarious checking of the presence or absence of a mail addressed to the second apparatus management unit;

vicarious checking means for checking the mail server to see if there is the mail addressed to the second apparatus management unit when the accepting means accepts the request for vicarious checking; and notifying means for, when there is the mail addressed to the second apparatus management unit, notifying the second apparatus management unit of the presence of the mail via the LAN.

2. The apparatus management unit as claimed in claim 1, further comprising:

vicarious checking requesting means for requesting the second apparatus management unit of vicarious checking of the mail addressed to said apparatus management unit.

3. The apparatus management unit as claimed in claim 2, further comprising:

a mode setting unit for setting a sleep mode, wherein said vicarious checking request means requests the second apparatus management unit of the vicarious checking immediately before the mode setting unit sets the sleep mode.

4. The apparatus management unit as claimed in claim 1, wherein the vicarious checking means reads the mail from the mail server when there is the mail addressed to the second apparatus management unit, and the notifying means transmits the read mail addressed to the second apparatus management unit to the second apparatus management unit.

5. The apparatus management unit as claimed in claim 1, wherein the communication network is the Internet.

6. The apparatus management unit as claimed in claim 1, wherein the apparatus is an image forming apparatus.

7. The apparatus management unit as claimed in claim 1, wherein the mail includes packet data.

8. An apparatus management system in which a mail server and a plurality of apparatus management units each connected to an apparatus to be managed are connected by a LAN, the mail server receives mails addressed to the apparatus management units from an external communication network, and each of the apparatus management units takes in a mail addressed to said each of the apparatus management units from the mail server, wherein said apparatus management unit comprises:

accepting means for accepting a request, from a second apparatus management unit connected to the LAN, for vicarious checking of the presence or absence of the mail addressed to the second apparatus management unit;

vicarious checking means for checking the mail server to see if there is the mail addressed to the second apparatus management unit when the accepting means accepts the request for vicarious checking; and notifying means for, when there is the mail addressed to the second apparatus management unit, notifying the second apparatus management unit of the presence of the mail via the LAN.

9. The apparatus management system as claimed in claim 8, wherein said second apparatus management unit includes vicarious checking requesting means for requesting the second apparatus management unit of vicarious checking of the mail addressed to the second apparatus management.

10. The apparatus management system as claimed in claim 9, wherein said second apparatus management unit includes a mode setting unit for setting a sleep mode, and said vicarious checking request means requests the second apparatus management unit of the vicarious checking immediately before the mode setting unit sets the sleep mode.

11. The apparatus management system as claimed in claim 8, wherein the vicarious checking means reads the mail from the mail server when there is the mail addressed to the second apparatus management unit, and the notifying means transmits the read mail addressed to the second apparatus management unit to the second apparatus management unit.

12. The apparatus management system as claimed in claim 8, wherein the communication network is the Internet.

13. The apparatus management system as claimed in claim 8, wherein the apparatus is an image forming apparatus.

14. The apparatus management system as claimed in claim 8, wherein the mail includes packet data.

15. An apparatus management system that manages apparatuses connected to first and second apparatus management units by transmitting and receiving mails including apparatus management data between a centralized management unit and the first and second apparatus management units, comprising:

a mail server which is connected to the first and second apparatus management units, and receiving mails addressed to the apparatus management units from an external communication network, wherein said first apparatus management unit comprises:

accepting means for accepting a request, from the second apparatus management unit, for vicarious checking of the presence or absence of a mail addressed to the second apparatus management unit;

vicarious checking means for checking the mail server to see if there is the mail addressed to the second apparatus management unit when the accepting means accepts the request for vicarious checking; and notifying means for notifying the second apparatus management unit of the presence of the mail when there is the mail addressed to the second apparatus management unit.

16. The apparatus management system as claimed in claim 15, wherein said second apparatus management unit comprises vicarious checking requesting means for requesting the first apparatus management unit of vicarious checking of the mail addressed to the second apparatus management.

17. The apparatus management system as claimed in claim 16, wherein said second apparatus management unit further comprising a mode setting unit for setting a sleep mode, said vicarious checking request means requests the first apparatus management unit of the vicarious checking immediately before the mode setting unit sets the sleep mode.

18. The apparatus management system as claimed in claim 15, wherein the vicarious checking means reads the mail from the mail server when there is the mail addressed to the second apparatus management unit, and the notifying means transmits the read mail addressed to the second apparatus management unit to the second apparatus management unit.

19. The apparatus management system as claimed in claim 15, wherein the communication network is the Internet.

20. The apparatus management system as claimed in claim 15, wherein the apparatus is an image forming apparatus.

* * * * *